(No Model.) 3 Sheets—Sheet 2.

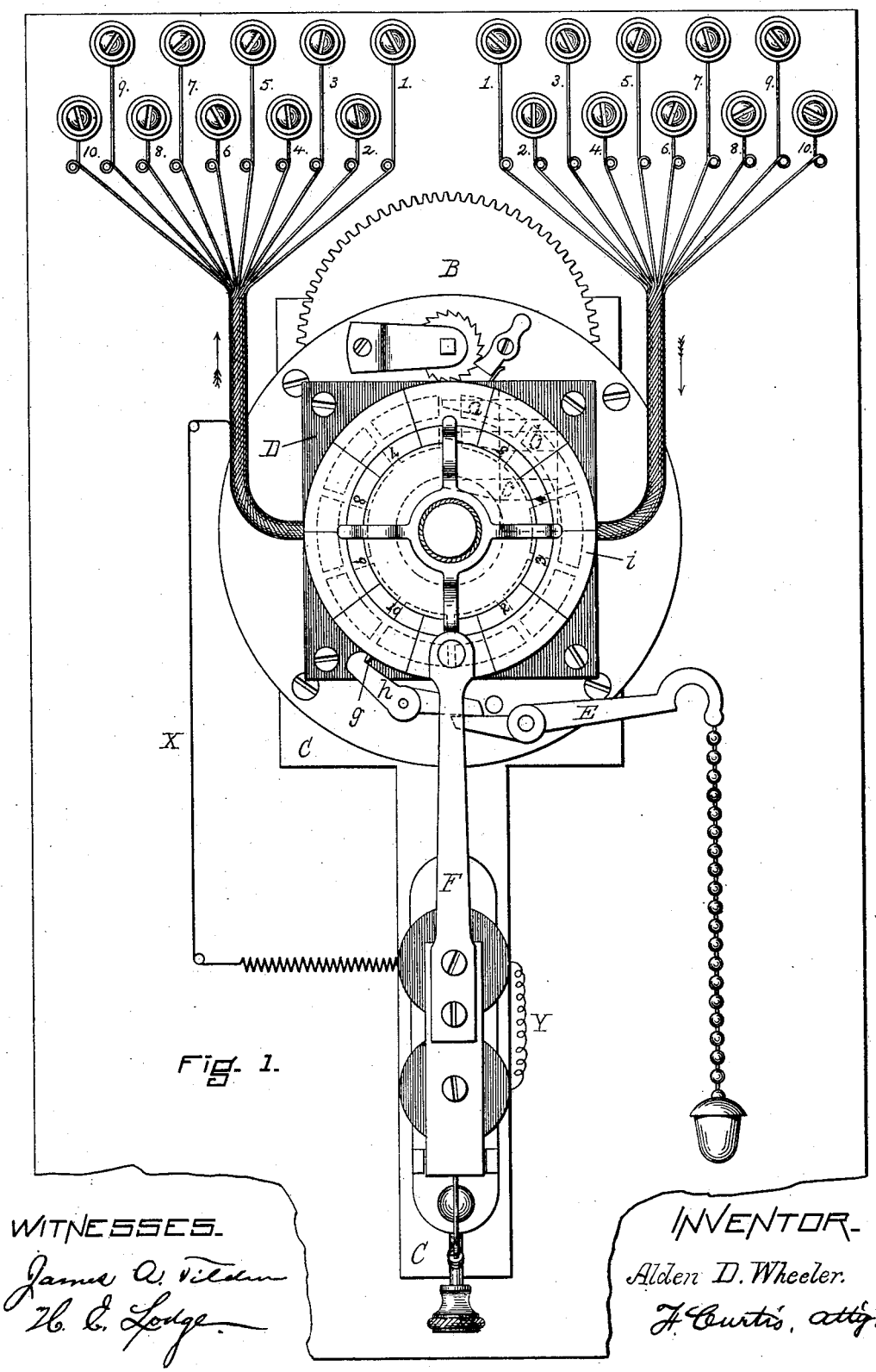

A. D. WHEELER.
APPARATUS FOR TESTING ELECTRIC CIRCUITS.

No. 359,338. Patented Mar. 15, 1887.

WITNESSES.
James A. Tilden
H. E. Lodge

INVENTOR.
Alden D. Wheeler.
H. Curtis, Atty.

(No Model.) 3 Sheets—Sheet 3.

A. D. WHEELER.
APPARATUS FOR TESTING ELECTRIC CIRCUITS.

No. 359,338. Patented Mar. 15, 1887.

WITNESSES.
James W. Tilson
H. E. Lodge

INVENTOR.
Alden D. Wheeler.
F. Curtis, Atty.

UNITED STATES PATENT OFFICE.

ALDEN D. WHEELER, OF HYDE PARK, MASS., ASSIGNOR TO THE AMERICAN AUTOMATIC FIRE ALARM ASSOCIATION, OF PORTLAND, MAINE.

APPARATUS FOR TESTING ELECTRIC CIRCUITS.

SPECIFICATION forming part of Letters Patent No. 359,338, dated March 15, 1887.

Application filed September 11, 1886. Serial No. 213,299. (No model.)

*To all whom it may concern:*

Be it known that I, ALDEN D. WHEELER, a citizen of the United States, residing at Hyde Park, in the county of Norfolk and State of Massachusetts, have invented certain new and useful Improvements in Apparatus for Testing Electric Circuits; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus for testing electric circuits, particularly those in which thermostatic alarms are employed, where it is desired to ascertain the efficiency of a circuit or series of circuits frequently and quickly, and at the same time secure a record to show which, if any, of said circuits is inoperative.

My present invention is, primarily, to enable the condition of the circuits to be ascertained in a few seconds at any time, regardless of the movements of the chronograph-clock with which said thermostatic or alarm systems are usually connected. This is accomplished, in brief, by means of an apparatus containing a plate in which are insulated the ends or terminals of the several individual circuits. To successively connect these terminals, to close and test each of the individual circuits, a metallic disk carrying circuit-closers, hereinafter described, and further provided with a recording-dial, is rotated by clock mechanism, while a wire common to all the circuits connects with an electro-magnet which operates a marker. Thus upon release of the clock mechanism the circuit-closers are rotated, passing successively and quickly over the terminals of every circuit. If each circuit is in an efficient condition, the electro-magnet is excited, the marker operated, and a record made. This record is repeated for each individual circuit, provided the latter are closed; but if open the lever fails to operate, and no record is obtained. A defective circuit is thus very readily ascertained. This apparatus can easily be arranged, if necessary, to test a "normally-open circuit" system.

Figure 3:
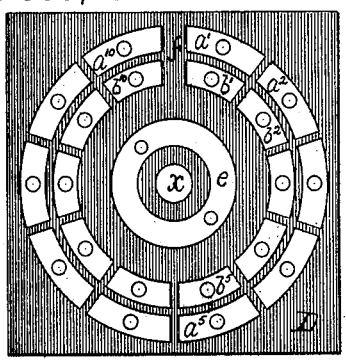
Figure 2:
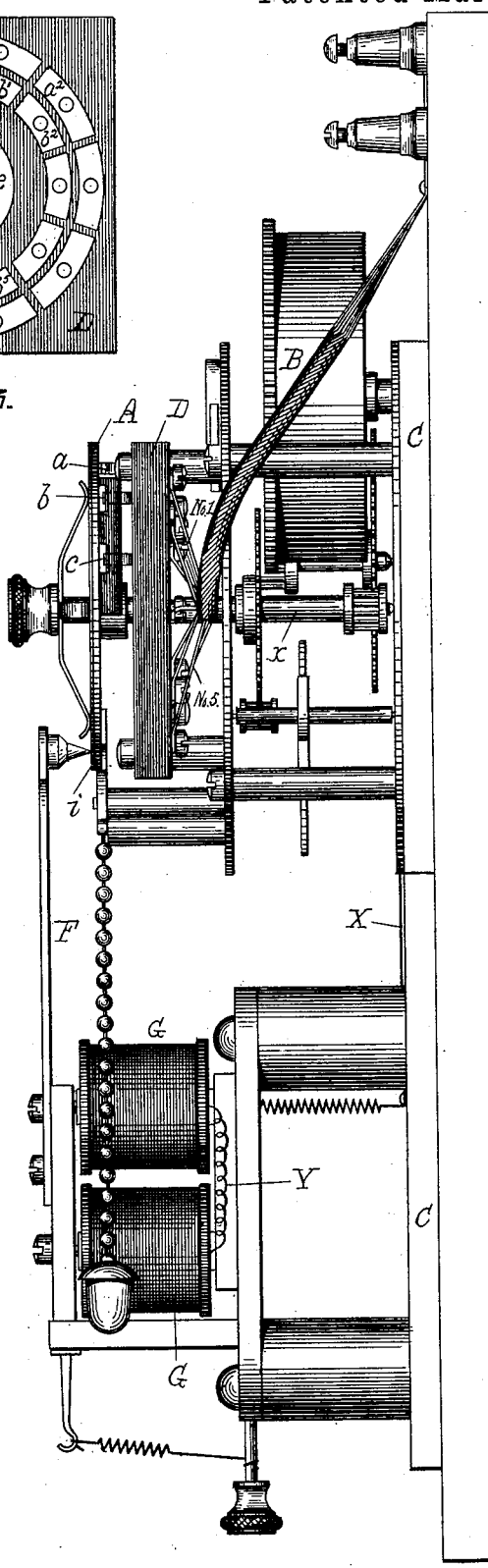

The drawings accompanying this specification represent, in Figure 1, a front elevation, and Fig. 2 a side view, of a circuit-testing apparatus embodying my invention. Fig. 3 is a plan of the insulating-plate containing the terminals of several electric circuits, while Fig. 4 is a sectional elevation in which is delineated the course of a single electric circuit.

In said drawings, A represents a circular metallic disk, which is mounted upon a shaft, $x$. The latter is actuated by ordinary clock mechanism, B, which is secured to a metallic plate, C. To this metallic disk A are attached, upon its rear side, three circuit-closers, $a$ $b$ $c$. The two latter are in metallic connection one with the other, but insulated from the disk, while the closer $a$ is in metallic connection with said disk. These closers are adapted to co-operate, when the disk A is rotated, with the terminals of the several circuits or series of circuits 1 2 3 4 5, &c., which are centered in the apparatus. These terminals or posts are arranged in two concentric circles and separately insulated in the plate D, which is located behind and in close proximity to the disk A upon the shaft $x$. Said terminals are designated at $a'$ $b'$ $a^2$ $b^2$ $a^3$ $b^3$ as belonging to individual circuits. A continuous metallic ring, $e$, is likewise disposed in the plate D, and forms a common terminal, employed successively for the various circuits in the system as each is tested.

Figure 4:
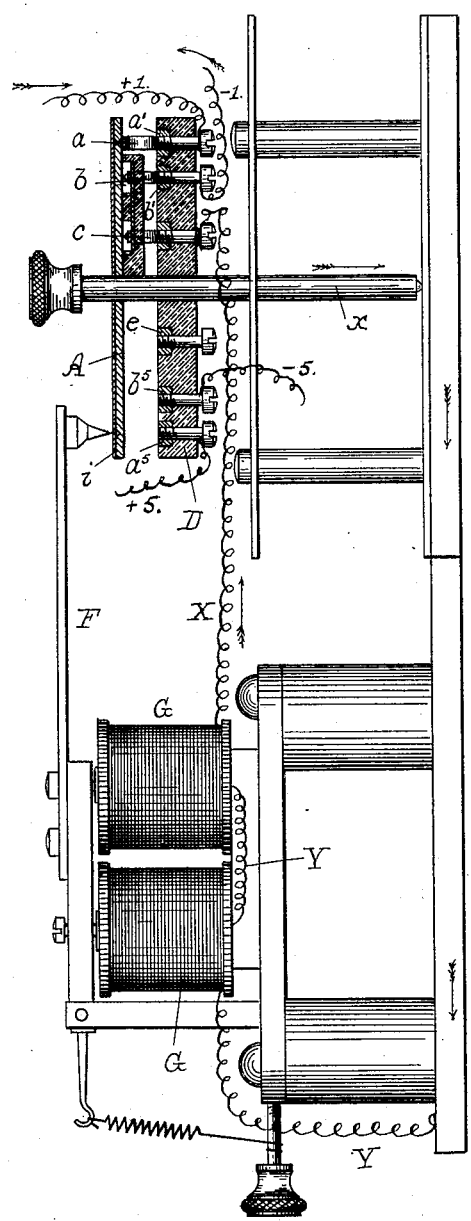

By reference to Fig. 4 it will be seen that the closer $a$ co-operates with all of the terminals $a'$ $a^2$ $a^3$, &c., the closer $b$ with all of the terminals $b'$ $b^2$ $b^3$, &c., and the closer $c$ with the terminal $e$. In Fig. 3 a wider space, $f$, is left between the terminals $a'$ $b'$ $a^{10}$ $b^{10}$, upon which the circuit-closers $a$ $b$ rest when the apparatus is inactive. The position of these circuit-closers upon the insulated material forming the space $f$ is determined by means of the peripheral stud $g$ on the disk A, which stud is normally engaged by the catch-lever $h$. When the disk is to be rotated by the clock mechanism B, this catch is disengaged from the stud $g$ through the lever E, which may be operated manually, as in the present instance, or automatically by time mechanism, or otherwise, as may be desired; hence it will be understood that by a movement of the lever E and release of the rotary disk A the latter is free to turn one complete revolution, and in so doing the circuit-closers are successively and momentarily placed in contact with the individual terminals of each circuit in the series. When one revolution has been made, the catch-lever is again in readiness to engage the stud, and the disk A is stopped.

In the operation of testing the efficiency of each circuit a record is generally desired, and this is obtained as follows: Exteriorly and removably secured upon the face of the rotary disk A is placed a paper or other recording-dial, $i$, divisionally arranged and numbered. Each number corresponds to a circuit, while the division so numbered is to receive the record for this particular circuit. The recorder or vibrating marker F consists of a pivoted lever furnished with a sharp point suited to pierce the dial at one end, while the other extremity is provided with an armature which is actuated by an electro-magnet, G G, actively induced by the main current of the system. Vibratory motions of the marker F are obtained by the alarm-bell in the circuit.

Now, on reference to Fig. 4, it will be seen that the electro-magnet is connected by the wire Y to the metallic plate C, and by the wire X to the terminal ring $e$, and through the latter, by the circuit-closers $b$ $c$, to the individual posts or terminals $b'$ $b^2$ $b^3$ of their respective circuits, Nos. 1, 2, 3. As each circuit is temporarily closed by the rotation of the disk A, the electro-magnet will be successively induced to actively operate the vibrating marker F, to make a record upon the divisional spaces only when that particular circuit corresponding thereto is in an efficient condition.

The course and direction of the various circuit-wires of any electric system terminating in and to be tested by this apparatus is as follows, presuming that all are similarly arranged as in circuit No. 1, the path of which is fully indicated by reference to Fig. 4. In this instance the disk A is supposed to be in rotation, and is now in that position when the circuit-closers $a$ $b$ are superimposed upon the terminals $a'$ $b'$, it being understood that the closer $c$ is continually in contact with the ring $e$. The current now enters upon wire + 1 of circuit No. 1, terminal $a'$, closer $a$, disk A, shaft $x$, thence, as indicated by arrows, to wire Y, magnet G, wire X, to terminal ring $e$ by closer $c$, to closer $b$, the two being in metallic connection, whence it passes to terminal $b'$ and emerges upon wire — 1. If this circuit No. 1 in the system is effective, the electro-magnets will become operative and attract the armature on the marker F, and impel its pointed end against the paper dial, and thus establish a record as to the condition of this particular circuit. Should this circuit be open in any place the magnets will remain inactive, as likewise the marker F, and the divisional space upon the dial will remain intact. Similarly, presuming the disk has revolved until the circuit-closers $a$ $b$ are in contact with the terminals $a^5$ $b^5$, circuit No. 5 will then be tested, and if operative the current will now pass along, entering upon $a^5$, and thence, as before, to wire X, by terminal ring $e$ to circuit-terminal $b^5$, and emerges along wire — 5.

Thus it will be seen that each circuit is successively tested in a rapid and efficient manner at any time by clock mechanism, or manually. Furthermore, the various instrumentalities forming this apparatus are very simple and compact, since each circuit successively employs the common wires X Y to excite the magnet G, and thereby insure a complete record of its condition at that special time.

I claim—

1. In a circuit-testing apparatus, a rotary disk provided with a record-dial and circuit-closers, in combination with the insulated terminals of a series of circuits successively wiped by said closers, the electro-magnets common to each circuit, and the marker operated intermittently at each successive test, one of said circuit-closers co-operating with all the terminals $a'$ $a^2$, &c., of one set, and the other circuit-closer co-operating with all the terminals $b'$ $b^2$, &c., of the other set, substantially as herein described.

2. In combination with a fixed plate, D, containing the individually-insulated terminals $a'$ $a^2$ $a^3$ $b'$ $b^2$ $b^3$, terminal ring $e$, and circuit-wires connected therewith, the circuit-closers $a$ $b$ $c$, attached to and carried by the disk A, the two closers $b$ $c$ being electrically united, but insulated from the said disk, as herein set forth.

3. The combination, with the metallic plate D, provided with the separately-insulated terminals $a'$ $a^2$ $a^3$ $b'$ $b^2$ $b^3$, and ring $e$, of the rotary disk carrying the circuit-closers $a$ $b$ $c$, the peripheral stud $g$, catch-lever $h$, and operating-lever E, substantially for purposes stated.

4. The disk A, its operating clock mechanism B, rotary circuit-closers $a$ $b$ $c$, stud $g$, and catch-lever $h$, in combination with a fixed insulating-plate, D, containing the terminals of the several circuits, and the marker F and electro-magnet G, operated successively by each and every circuit, substantially as described.

In testimony whereof I affix my signature in presence of two witnesses.

ALDEN D. WHEELER.

Witnesses:
JAMES A. TILDEN,
H. E. LODGE.